Sept. 29, 1964  A. G. F. WALLGREN  3,150,533
GEARING

Filed June 12, 1961  3 Sheets-Sheet 1

INVENTOR
AUGUST GUNNAR FERDINAND WALLGREN

BY
ATTORNEY

Sept. 29, 1964  A. G. F. WALLGREN  3,150,533
GEARING

Filed June 12, 1961  3 Sheets-Sheet 3

INVENTOR
AUGUST GUNNAR FERDINAND WALLGREN

BY
ATTORNEY

# United States Patent Office 3,150,533
Patented Sept. 29, 1964

3,150,533
GEARING
August Gunnar Ferdinand Wallgren, 33 Viktor
Rydbergsgatan, Goteborg, Sweden
Filed June 12, 1961, Ser. No. 116,575
Claims priority, application Sweden June 22, 1960
2 Claims. (Cl. 74—397)

This invention relates to a gearing.

More particularly this invention relates to a gearing of the type having an input and an output shaft upon which interengaging gear members are mounted.

One main object of the invention is to simplify and cheapen the manufacture of gearings of the type in consideration and at the same time to reduce considerably the size of the stock necessary to keep for immediate delivery o fgearings of the various gear ratios occurring.

The type of gearing embodying the invention has the input shaft carried in at least one eccentrically made bushing inserted in the casing of the gearing and another object of the invention is to render possible by means of said eccentric bushing, assembly of two gearings having different gear ratios of the same parts except for the pinion gear member on the input shaft which, as a matter of fact, always must be adjusted in correspondence to the value of the gear ratio.

A further object of the invention is to provide means in gearings of the type set forth which by use of the same parts but another eccentricity of the bushing and a corresponding gear member on the input shaft to obtain two further types of the gearing and so on. It is thus possible while utilizing the same make of the essential parts of the gearing, such as the casing and the heavier output shaft with its larger gear wheel, to cover a gear ratio range of, for instance, from 1:2 to 1:10 merely by varying the bushings and the pinion gear member of the input shaft.

Further objects and advantages of the invention will become apparent from the following description considered in connection with the accompanying drawings, which form part of this specification, and of which—

Figure 1:
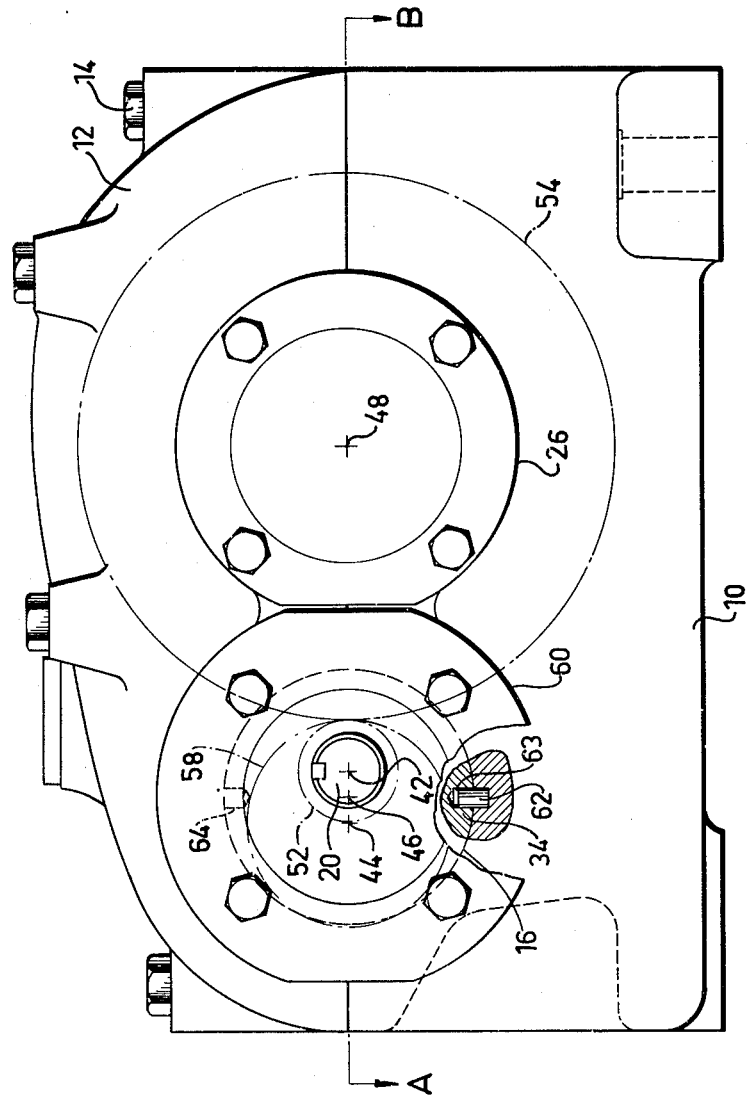
FIG. 1 is a side elevation of a horizontally divided gearing manufactured in accordance with the teachings of the invention.

Referring to the drawings, reference numerals 10 and 12 denote the upper and lower half, respectively, of a horizontally divided casing, said halves being connected by means of bolts 14. The two halves form together two pairs of coaxial cylindrical bores 16 and 18 for the input shaft 20 and the output shaft 22, respectively. The latter is carried in the usual manner in bearings 24, preferably of the rolling contact type, which are introduced into the bores 18. Said bores are closed by covers 26 and 28, respectively, and one bearing 24, for instance the lefthand bearing of FIG. 2, may be axially fixed. The shaft 22 carries the larger gear wheel 30 of the gearing, which gear wheel may comprise two annular gear members 32, preferably having their teeth oppositely cut so as together to form a double-helical or herringbone gear.

The bores 16 house bushings 34 made according to the invention and having an external peripheral surface fitting in the bores. The bushings 34 are eccentric so that their internal peripheral surface 36 has a different axis than the external surface of the bushing, each bushing receiving the outer race 38 of a rolling contact bearing 40 of the ball or roller type which carries the shaft 20. The axis of said shaft 20 always coincides with the axis of surface 36.

Figure 2:
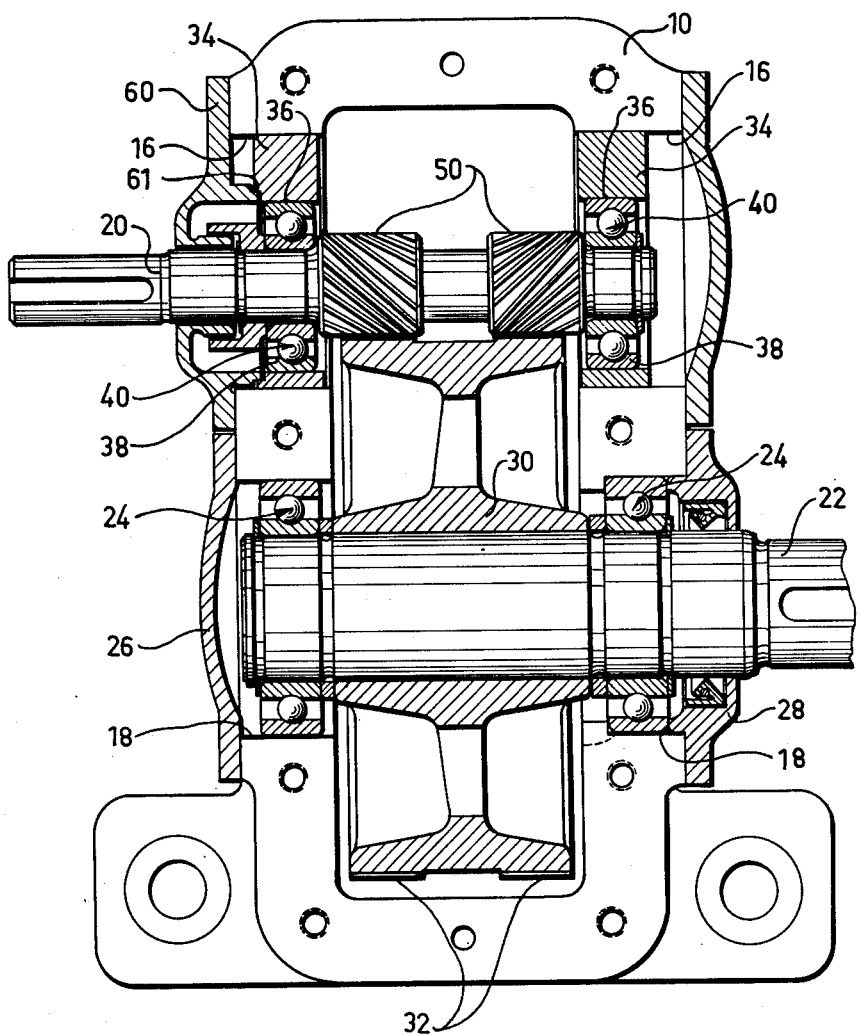
FIG. 2 shows the gearing partly in section along line A—B in FIG. 1 with the top half removed.
Figure 3:
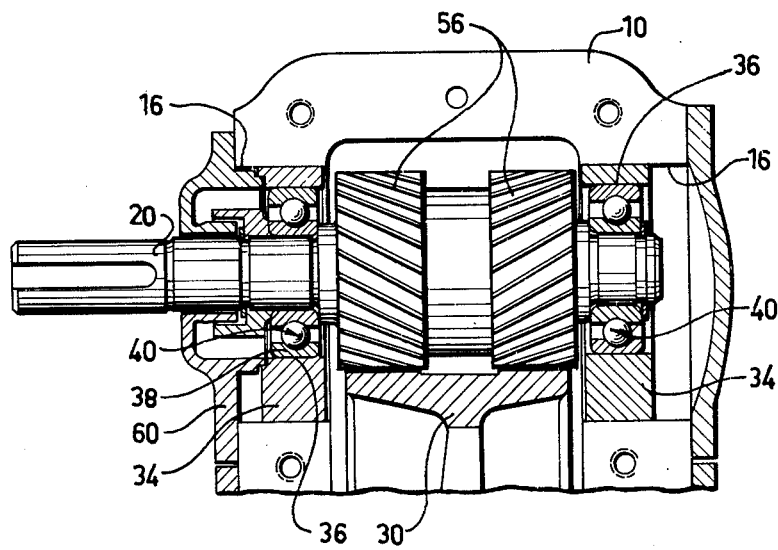
FIG. 3 is a view similar to FIG. 2 but shows another gearing member on the input shaft for providing the smaller gear ratio.

The last-mentioned axis can assume either of the positions indicated at 42 and 44 in FIG. 1 on both sides of the axis 46 of the bore 16. Axes 42, 44, 46 will then be located, as will also the axis 48 of the output shaft 22, in one and the same horizontal plane corresponding to the parting plane between the two halves of the casing of the gearing. In FIG. 2 the shaft 20 is shown with its axis or center line in the position 42. Two gears or pinion gear members 50 are provided on the shaft, which gear ring members may be made integral with said shaft and which engage the pinion gear members 32. The gearing now has a gear ratio of, e.g., 1:6. The gears 50 have a pitch circle 52 corresponding to the larger pitch circle 54 of the gear members 32. If the bushing 34 is turned exactly one half of a revolution, the axis of shaft 20 will be moved to the position 44. In this new position there are provided on the shaft 20 gears or gear pinion members 56 coacting with the gear members 32, see FIG. 3, said gear pinion members 56 in this case having a pitch circle 58 twice as large as the pitch circle 52. This means that the gearing will now have instead a gear ratio of 1:3.

The bushing 34 is fixed in its two positions by means of a guide pin 62 located in the lower half 10 of the casing, which pin co-operates with either of two diametrically opposed radial bores 63, 64 extending from the external peripheral surface of the bushing. About the shaft 20 there is disposed a cover 60 secured in both halves of the casing, said cover having an eccentric opening for the shaft. The cover 60 is centered on the bushing 34 by means of a guiding edge 61 concentric with the bearing seat 36.

According to the invention, two types of gearing may thus be provided merely by the bushing 34 being turned 180°. The remaining parts of the gearing are unchanged except for the smaller gear whose design is conditional on the gear ratio, which obviously is the same as the ratio between the pitch circle 52 or 58 of the small gear pinion members and the pitch circle 54 of the large gear members. As the output wheel is always used—independently of the gear ratio—the bearing load is also virtually independent of the gear ratio. The life of the bearings will then depend only on the r.p.m. of the shaft, and if the input shaft bearings are selected for maximum r.p.m. the same bearing size may be used throughout the whole operating range.

For achieving a new gear ratio one has only to see to it that the eccentricity of the internal surface 36 of bushing 34 provides two centre positions 42 and 44, respectively, of the shaft 20, the gears or pinion gear members 50 and 56 then having the proper diameter. It will be easily understood that the manufacture may be standardized very much by the feature that the most expensive parts—the casing and the large gear wheel—are independent of the gear ratio. In addition, the large gear wheel of the series of double gearings manufactured along side of single gearings may be embodied unchanged in this gearing.

With one and the same bushing 34 one could even cover all possible gear ratios within a predetermined range as the axis of the internal surface 36 of the bushing describes a circle when passing between points 42 and 44, the distance of said axis from the parting line 54 being continuously changed, but in such a case the axis of the shaft 20 would be located in its intermediate positions above or below the horizontal parting plane between the halves of the casing, which is not desirable in most cases.

While several embodiments of the invention have been shown and described, it should be understood that this is for purpose of illustration only, and that the invention is not to be limited thereby, but its scope is to be determined by the appended claims.

What I claim is:

1. Gearing structure to provide for at least two gear ratios comprising a casing having upper and lower portions connected along a line of separation, said casing having two pairs of spaced generally cylindrical bores, the axis of said bores being substantially along the line of separation of said upper and lower portions, a pair of concentric bearings mounted in one of said pairs of bores, an output shaft rotatably carried by said bearings and extending outwardly of said casing, a gear carried by said output shaft and disposed within said casing, a pair of bushings removably mounted in the other of said pairs of bores, each of said bushings having an eccentric opening, a bearing mounted in each of said openings, an input shaft rotatably carried by said bearings and having a portion extending outwardly of said casing, a pinion gear member selectively and removably fixed on said input shaft within said casing, the axis of rotation of said input shaft being offset from the axis of said one pair of bores and disposed substantially along the line of separation of said casing, said bushings adapted to be selectively rotated to locate the axis of rotation of said shaft on either side of the axis of said one pair of bores, and means for locking said bushings in selected position.

2. The structure of claim 1 in which said locking means include pin means fixed to one portion of said casing, and said bushing having diametrically opposed openings of a size to receive said pin means, whereby said bushing can be selectively inserted in said bores in one of two positions.

References Cited in the file of this patent
UNITED STATES PATENTS

| | | |
|---|---|---|
| 1,799,100 | Keil | Mar. 31, 1931 |
| 2,021,935 | Griswold | Nov. 26, 1935 |
| 2,507,555 | Berthiez | May 16, 1950 |
| 2,530,425 | Eberhardt | Nov. 21, 1950 |
| 2,920,497 | Wiken | Jan. 12, 1960 |